United States Patent Office 3,524,722
Patented Aug. 18, 1970

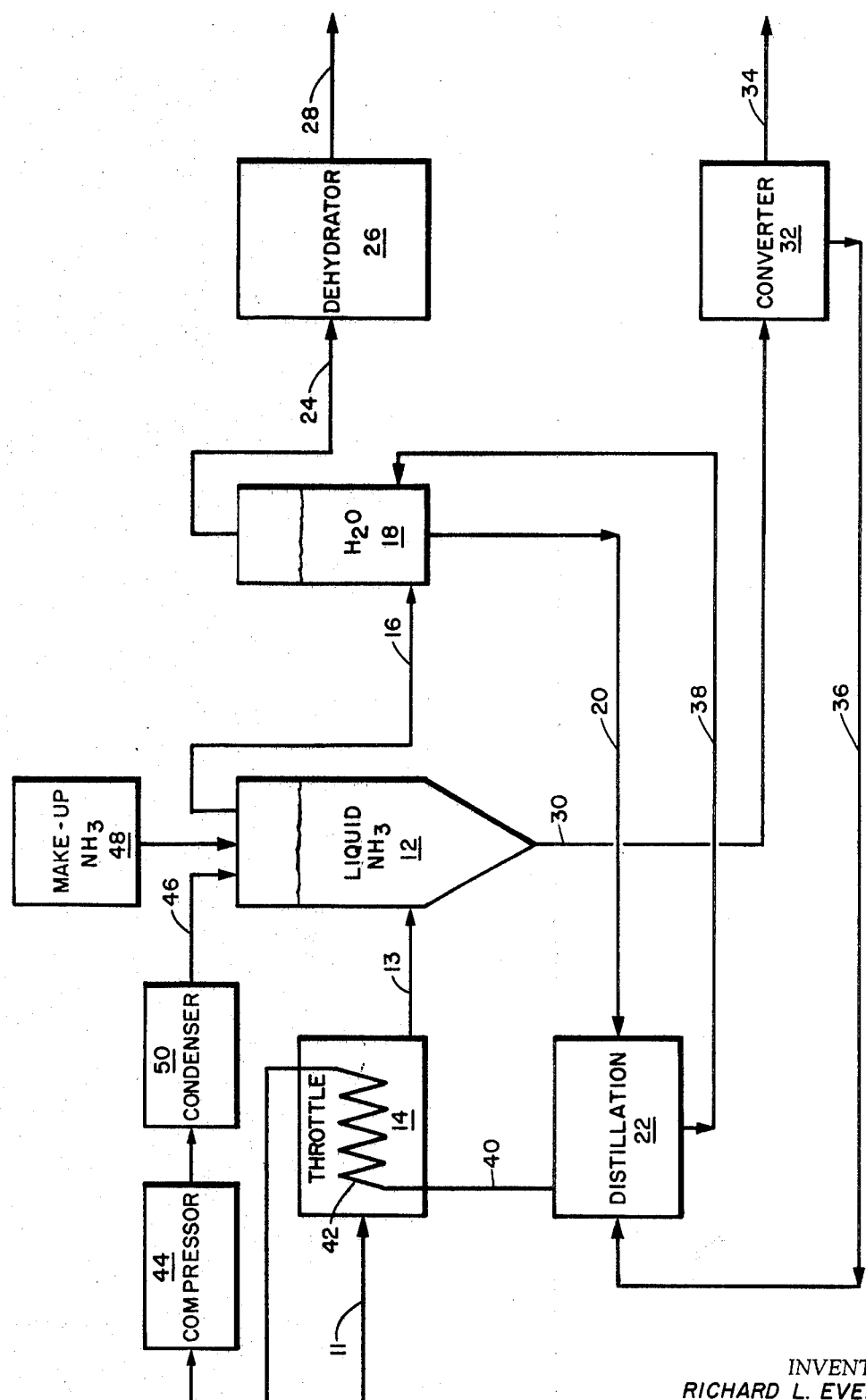

3,524,722
REMOVAL OF CARBON DIOXIDE
FROM NATURAL GAS
Richard L. Every and Ralph Leroy Grimsley, Ponca City, Okla., assignors to Continental Oil Company, Ponca City, Okla., a corporation of Delaware
Filed June 8, 1966, Ser. No. 556,014
Int. Cl. B01d 47/00; C07c 127/00
U.S. Cl. 23—3
2 Claims

ABSTRACT OF THE DISCLOSURE

A method of removing carbon dioxide from sour natural gas by bubbling the same natural gas through a body of liquid ammonia to convert the gaseous carbon dioxide to solid ammonium carbamate. The purified natural gas is then separated from the reaction mixture.

---

This invention relates to a process for purifying natural gas, and, in one aspect, relates to the removal of carbon dioxide from natural gas by chemically reacting the carbon dioxide with liquid ammonia.

As it occurs in the earth, natural gas seldom, if ever, consists of pure methane. Not only are heavier hydrocarbons ordinarily found with the methane; but, in addition, other gases, such as helium and the so-called acid gases, such as carbon dioxide and hydrogen sulfide, also occur. Depending upon the amounts of these other materials, they may or may not present problems in the handling, processing and utilization of the natural gas. In so-called "sweet" gas, for instance, the presence of carbon dioxide and hydrogen sulfide presents little or no problem even though it may be present in trace amounts; however, as the ratio of carbon dioxide to methane increases, it becomes increasingly necessary to remove the carbon dioxide prior to utilization of the methane. There are many reasons for this need for purification which include the fact that the presence of carbon dioxide reduces B.t.u. content per standard foot of the natural gas and, in some handling techniques, corrosion problems are encountered due to the formation of carbonic acid due to the presence of the carbon dioxide.

A number of possible solutions have been proposed, with varying degrees of success, for the problem of carbon dioxide removal. For instance, it has been proposed to cool down the natural gas stream to a sufficient degree to solidify the acid gas impurities and thereafter to remove these impurities in the solid form. While theoretically feasible, trouble has been experienced in applying these techniques commercially due to the difficulty in segregating the solid carbon dioxide particles from the hydrocarbon components. Similarly, when amine purification is utilized, the costs involved have, on occasion, proved a major obstacle to the commercialization of marginal gas deposits.

Other purification techniques, with their associated shortcomings, might likewise be mentioned; however, it is believed that the above two examples will suffice in order to demonstrate the fact that, until the present invention, a natural gas purifying process which is simple and economical to operate and which produces a desired by-product from carbon dioxide impurities within the natural gas had remained an elusive desideratum.

It is, therefore, an object of this invention to provide a process for purifying natural gas.

Another object of the present invention is to provide a process for purifying natural gas to produce a useable by-product.

Still another object of the present invention is to provide a process for purifying natural gas which can be practiced utilizing standard processing equipment.

Yet another object of the present invention is to provide a process for removing carbon dioxide from natural gas without encountering problems of separating the carbon dioxide from the gas once it has been segregated.

Still another object of the present invention is to provide a process for removing carbon dioxide from natural gas to produce not only sweet natural gas but also a usable agricultural fertilizer.

These and other objects may be realized from the practice of the present invention, one aspect of which may be summarized as comprising the steps of introducing a natural gas stream containing carbon dioxide beneath the surface of a liquid ammonia bath and allowing the natural gas stream to bubble upward to the surface of the liquid ammonia. In passing through the liquid ammonia in the form of bubbles, the natural gas loses the major portion of the carbon dioxide carried therein due to the chemical reaction of the carbon dioxide and the ammonia to form ammonium carbamate. The thus purified natural gas is then collected and removed, while the ammonium carbamate is removed and, if desired, converted to urea.

A more complete understanding of the invention may be obtained from reading the following detailed description of one method for practicing it together with the accompanying drawing which presents a flow-scheme useful in practicing the invention.

Of basic importance to this invention is the concept of bubbling natural gas, which contains at least about 10 p.p.m. carbon dioxide, through liquid ammonia whereby the carbon dioxide within the gas reacts chemically with the ammonia and is thereby removed from the natural gas stream. In the accompanying drawing, a reactor vessel 12, which contains a quantity of liquid ammonia at a pressure of from about 150 to about 1000 p.s.i.a., and preferably at from about 200 to 400 p.s.i.a., is provided to receive a natural gas stream containing carbon dioxide impurities. This stream is introduced into the bottom of vessel 12 from a conduit 13 and subsequently bubbles upwardly to the surface of the liquid ammonia where it is collected and removed from the vessel. Since the reaction time between the carbon dioxide within the natural gas stream and the ammonia will depend upon the time during which the natural gas moves through the ammonia in the form of bubbles, it is important that the depth of the liquid ammonia above the natural gas inlet be sufficient to allow substantially complete reaction of all of the carbon dioxide with the liquid ammonia. Thus, this depth will vary depending upon the concentration of the carbon dioxide in the natural gas and the size of the bubbles which are formed at the bottom of vessel 12. Commonly a column of liquid ammonia at least about 10 feet long will be used, while one of at least 40 feet is preferred.

In general, it may be seen that the smaller the bubbles of natural gas which move through the liquid ammonia the more rapid and, therefore, the more complete will be the reaction between the ammonia and the carbon dioxide for a given depth of ammonia. It will, therefore, be found advantageous to utilize some structure for forming a plurality of relatively small bubbles at the bottom of reactor vessel 12. For instance, a header having a multitude of small apertures formed in one side thereof would serve admirably for this purpose; although, other means for dispersing the bubbles within the liquid ammonia will be obvious to those skilled in the art.

It is not uncommon for natural gas to occur at relatively high pressure; consequently, in order to reduce the handling problems and also to take advantage of the energy represented by the high pressure, it is desirable, when the incoming natural gas is at a pressure of above about 800 p.s.i.a., to reduce the pressure of the natural gas prior to its introduction into vessel 12. In the flow scheme shown in the drawing, this pressure reduction is obtained in a throttling chamber 14 where the gas is reduced to at least aboue 400 p.s.i.a. and preferably to about 300 p.s.i.a. After throttling, the gas which is at a relatively low temperature due to the expansion step contacts the coils of a heat exchanger 42 for a purpose which is hereinafter set forth.

Upon leaving reactor vessel 12, the purified natural gas is collected and passed through conduit 16 into a stripper 18 which, in the embodiment shown in the drawing, comprises a water bath which is maintained at a temperature of from about 15 to about 45° C. and preferably from about 20 to about 25° C. In stripper 18, ammonia which accompanies the natural gas from reactor vessel 12 goes into solution in the water and is thus removed from the natural gas stream. This ammonia is later recovered by being passed through conduit 20 into a still 22.

From stripper 18, the natural gas, which now contains water vapor, passes through conduit 24 to a dehydrator 26. Dehydrator 26 may be one of several types well known in the art, such as a silica gel adsorption unit or a molecular sieve. The purified dry-gas stream leaves dehydrator 26 through conduit 28 for transmission or storage.

Ammonium carbamate which is formed in reactor vessel 12 is removed in a slurry with liquid ammonia from the bottom of the reactor through a conduit 30 and transmitted to a converter 32. In converter 32 the carbamate is converted to urea according to the formula

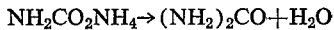

$$NH_2CO_2NH_4 \rightarrow (NH_2)_2CO + H_2O$$

with the urea being removed through conduit 34 while the water and ammonia from the slurry is removed from the converter through conduit 36 for introduction into still 22. Converter 32 may be one of several types and, in its simplest form, comprises a heated chamber which is maintained at a temperature of at least 180° C. and at a pressure of at least 170 p.s.i.a.

Still 22, which is provided to separate water from ammonia, operates at a temperature from about 0 to about 120° C. and at a pressure from about 0.5 to about 550 p.s.i.a., and preferably operates at a temperature from about 85 to about 105° C. and at a pressure of about 50 to about 90 p.s.i.a. Water is removed from the still through conduit 38 and reintroduced into stripper 18. The ammonia which emerges through conduit 40 is cooled by the throttled incoming natural gas stream in a heat exchanger 42. A compressor 44 then receives the cooled ammonia stream and increases the pressure on the stream to not less than about 300 p.s.i.a., with a rise in temperature to not more than 25° C. which is controlled by condenser 50. Under these conditions, the ammonia is in the liquid state and is returned through conduit 46 to reactor vessel 12.

It will be appreciated that nitrogen will leave the system in the form of urea; and, consequently, it will be necessary to provide ammonia make-up to the reactor vessel 12 from a source such as is indicated generally by the numeral 48.

In a specific example, natural gas containing 50,000 p.p.m. carbon dioxide is introduced into throttling chamber 14 at a temperature of 25° C. and a pressure of 1,000 p.s.i.a. On leaving chamber 14, the natural gas stream has been reduced to a pressure of 300 p.s.i.a. and, due to the heat picked up in heat exchange with the ammonia from still 22, remains at a temperature of approximately 25° C. This relatively low pressure gas stream is then introduced into reactor vessel 12 where the carbon dioxide within the stream reacts with the ammonia and falls to the bottom of the vessel as solid ammonium carbamate. The purified natural gas stream which emerges from vessel 12 through conduit 16 at a temperature of 22° C. and pressure of 295 p.s.i.a. is found to contain less than 10 p.p.m. carbon dioxide together with approximately 300,000 p.p.m. ammonia vapor. From conduit 16, the purified gas stream is introduced into stripper 18 and emerges therefrom at a pressure of approximately 290 p.s.i.a. and at a temperature of 22° C. with only trace amounts of ammonia and approximately 1500 p.p.m. water vapor. In order to remove the water vapor it is then passed through dehydrator 26 from which it emerges at approximately 22° C. and 285 p.s.i.a.

In converter 32 the ammonium carbamate formed in reactor vessel 12 is heated to a temperature of approximately 180° C. at a pressure of 170 p.s.i.a. and the ammonia and water are removed together and passed to still 22 where they are combined with an ammonia water stream from stripper 18 and subsequently heated to approximately 95° C. at a pressure of about 70 p.s.i.a. Under these conditions the ammonia rises as a vapor and is passed to heat exchanger 42 where the temperature of the ammonia is reduced from 95° C. to 0° C. at a pressure of 70 p.s.i.a. The cooled gaseous ammonia is then passed through compressor 44 and condenser 50 where its pressure is raised to approximately 300 p.s.i.a and its temperature to approximately 22° C. under which conditions it is a liquid which is subsequently reintroduced into reactor 12.

The process described thus far has general application whenever it is desired to remove carbon dioxide from a natural gas stream. As such, it can be relied upon to produce satisfactory results without particular regard to the amount of material to be treated or the pressure of the incoming gas stream. There are, however, a number of modifications which can be made in the event that relatively large quantities of gas are to be treated; and this is especially true when such large quantities of gas are at relatively high pressures, that is at pressures at least about 800 p.s.i.a. Under such circumstances it might, for instance, be found advantageous to utilize the gas pressure in a turbine expander to operate compressor 44. Similarly, the relatively low temperature gas emerging from the turbine expander could be utilized for overhead condensation in still 22.

Moreover, the stream in line 36 could be heat exchanged with the liquid material in still 22 in order to furnish heat for distillation. These and similar alterations can be made to increase the efficiency of the basic process, depending upon the conditions encountered.

In general, it may be seen that the exact nature of the carbon dioxide removal processes practiced according to this invention vary depending upon the various parameters of the system; and, as a result, it is not possible to prescribe specific conditions of universal application. However, those skilled in the art will, by the foregoing description, be enabled to design a purification system according to this invention once these parameters are known. Among such parameters which must be taken into account are the pressure of the raw natural gas, the pressure at which the purified gas must be delivered, the initial temperature of the raw natural gas, the delivery temperature required of the purified natural gas, the specification carbon dioxide content of the purified natural gas and the initial carbon dioxide content of the raw gas. Moreover, while it will ordinarily be found advantageous to convert the ammonium carbamate into urea, it is nevertheless possible to decompose the carbamate into ammonia and carbon dioxide which are subsequently separated with the ammonia being reliquefied and recycled.

In view of the number of parameters which must be taken into account in designing specific processes for specific conditions, it is to be understood that, while one method of practicing the present invention has been described above and while general operating conditions have been set forth, the present invention is nevertheless not limited to those operating conditions nor to the precise process above described, but rather is limited only by the spirit and scope of the appended claims.

What is claimed is:

1. A method for purifying a natural gas stream containing at least 10 p.p.m. carbon dioxide which comprises the steps of:
   (a) flashing the gas stream from a pressure exceeding approximately 800 p.s.i.a to a pressure not exceeding approximately 400 p.s.i.a;
   (b) passing the relatively low pressure gas stream into a liquid ammonia bath at a point at least about 10 feet from the top of the bath whereby the carbon dioxide is reacted with ammonia to form solid ammonium carbamate which settles to the bottom of said bath;
   (c) collecting the gas at a point above the surface of the liquid ammonia at a temperature of from about 15 to 30° C. and a pressure of about 200 to 400 p.s.i.a. and thereafter introducing it at a point below the surface of a water bath having a temperature not greater than 45° C. to remove ammonia vapor mixed with the gas;
   (d) collecting the gas at a point above the surface of the water and passing the gas through a dehydrator to remove the water vapor mixed therein;
   (e) withdrawing the liquid ammonia-wet solid ammonium carbamate from the liquid ammonia bath and transferring the same to a chamber which is maintained at a temperature of at least 170° C. to convert the ammonium carbamate to urea and water;
   (f) heating a mixture of ammonia and water resulting from step (e) to separate the ammonia from the water;
   (g) heat exchanging the ammonia separated from step (f) with the gas flashed in step (a) to reduce the temperature of the ammonia to at least about 0° C.;
   (h) compressing the relatively low temperature ammonia to a pressure of at least about 300 p.s.i.a.;
   (i) cooling said ammonia to a temperature not exceeding about 22° C. whereby said ammonia is reliquefied; and
   (j) returning the liquid ammonia to the bath defined in step (b).

2. The method defined in claim 1 wherein the depth of the liquid ammonia bath is at least 40 feet.

References Cited
UNITED STATES PATENTS

| | | | |
|---|---|---|---|
| 1,344,673 | 6/1920 | Bosch | 260—555 |
| 3,298,949 | 1/1967 | Nelson | 23—3 X |
| 960,788 | 6/1910 | Behrens | 23—150 |
| 2,205,962 | 6/1940 | Reich | 23—150 |
| 3,310,376 | 3/1967 | Cook et al. | 23—2 X |

EARL C. THOMAS, Primary Examiner

U.S. Cl. X.R.

260—555, 676